(12) United States Patent  
Hubbard et al.

(10) Patent No.: US 6,796,335 B1
(45) Date of Patent: Sep. 28, 2004

(54) PIPE PROTECTOR AND SUPPORT

(75) Inventors: Mark David Hubbard, Kirkland, WA (US); Thomas Lee Kendall, San Marcos, CA (US)

(73) Assignee: Securus, Inc., San Marcos, CA (US)

( * ) Notice: Subject to any disclaimer, the term of this patent is extended or adjusted under 35 U.S.C. 154(b) by 223 days.

(21) Appl. No.: 09/970,394

(22) Filed: Oct. 3, 2001

Related U.S. Application Data

(63) Continuation-in-part of application No. 09/876,862, filed on Jun. 7, 2001, now abandoned.
(60) Provisional application No. 60/210,714, filed on Jun. 9, 2000.

(51) Int. Cl.[7] .................................................. F16L 3/00
(52) U.S. Cl. ..................... 138/106; 138/107; 138/112; 248/57
(58) Field of Search ................................. 138/106, 107, 138/112, 89; 220/234, 235, 236, 254.3, 254.8, 259.3, 293, 295, 304, 314; 248/57, 68.1, 71

(56) References Cited

U.S. PATENT DOCUMENTS

| | | | | |
|---|---|---|---|---|
| 1,791,420 A | * | 2/1931 | Mayo | 248/274.1 |
| 2,661,483 A | * | 12/1953 | Tortorice | 4/695 |
| 2,843,363 A | * | 7/1958 | Mailander | 165/67 |
| 3,809,350 A | * | 5/1974 | Lane | 248/57 |
| D293,203 S | * | 12/1987 | Hertensteiner | D8/354 |
| 4,909,461 A | * | 3/1990 | Collins | 248/68.1 |
| 5,060,892 A | * | 10/1991 | Dougherty | 248/57 |
| 5,615,850 A | * | 4/1997 | Cloninger | 248/68.1 |
| 5,971,329 A | * | 10/1999 | Hickey | 248/68.1 |
| 6,012,685 A | * | 1/2000 | Saraceno, Jr. | 248/68.1 |
| 6,135,156 A | * | 10/2000 | Donoho et al. | 138/89 |
| 6,402,096 B1 | * | 6/2002 | Ismert et al. | 248/68.1 |
| 2003/0042371 A1 | * | 3/2003 | McCahill et al. | 248/57 |

* cited by examiner

*Primary Examiner*—James Hook
(74) *Attorney, Agent, or Firm*—Stetina Brunda Garred & Brucker

(57) ABSTRACT

An elongated strap has a plurality of openings sized to hold plumbing pipes extending through the openings. The openings have a periphery that undulates so the periphery extends on opposing sides of the strap to increase the periphery in contact with the pipe along the longitudinal axis of the pipe. A fluid-tight pipe cover releasably connects to further openings in the strap. The pipe cover has a first, open end sized to fit over the pipe. The open end has projections cooperating with the further openings to releasably fasten the cover to the strap. The cover has a closed, distal end that extends beyond the distal end of the pipe during use of the device. A seal is interposed between the cover and the pipe during use of the device to prevent the passage of fluid from the pipe past the seal.

23 Claims, 12 Drawing Sheets

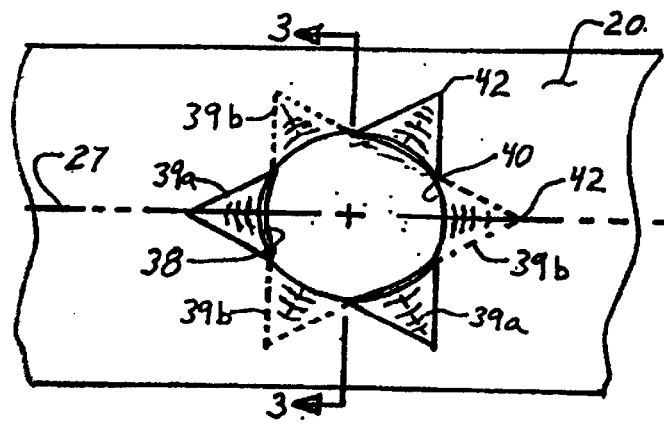
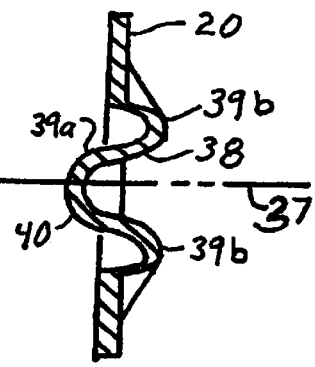
Fig. 2
Fig. 3
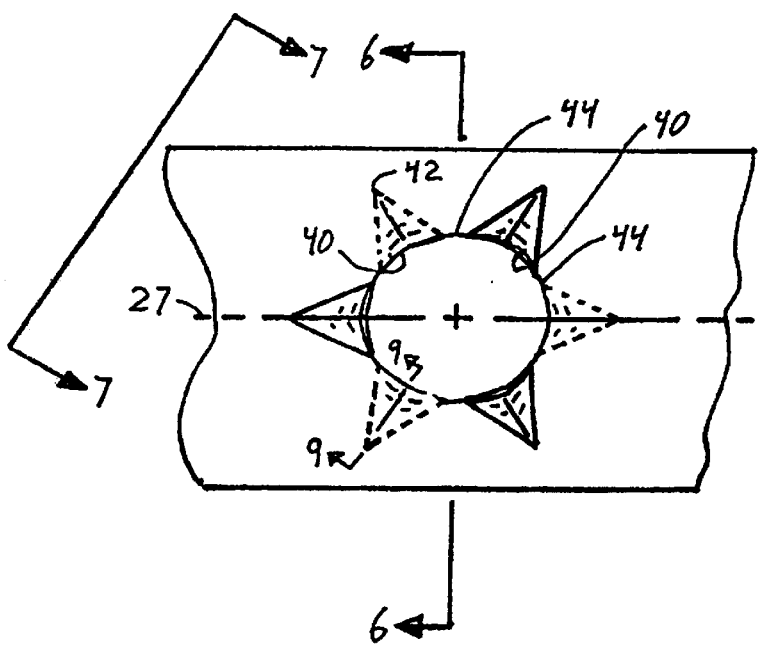
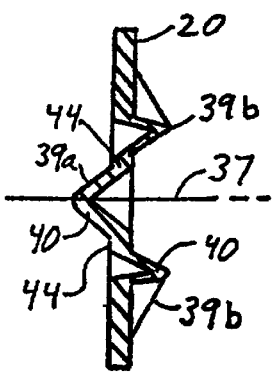
Fig. 5
Fig. 6

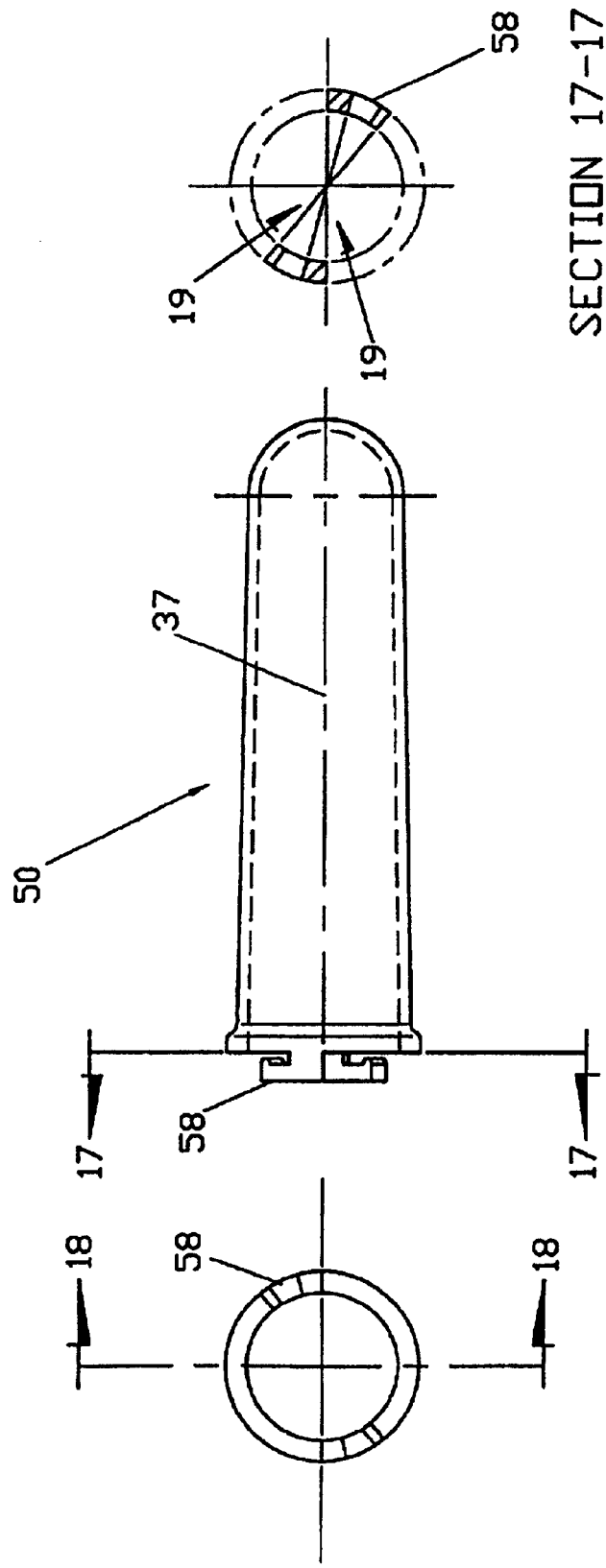

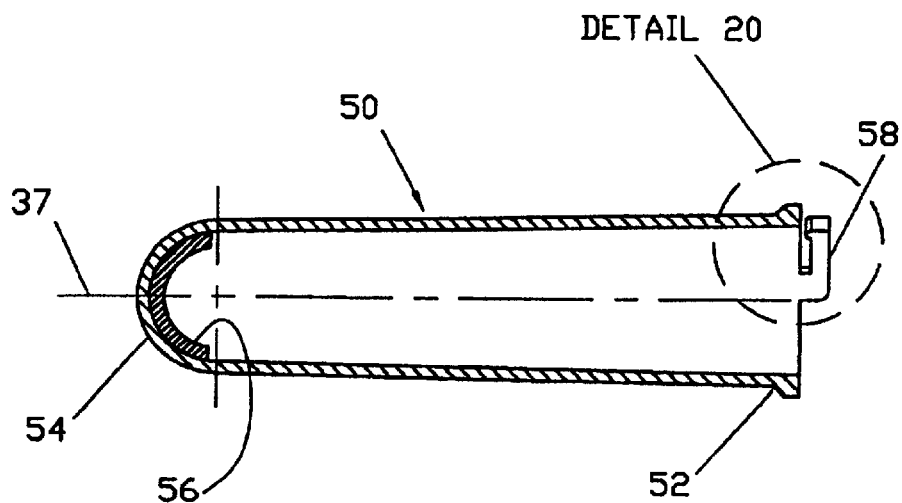
SECTION 18-18
Fig. 18
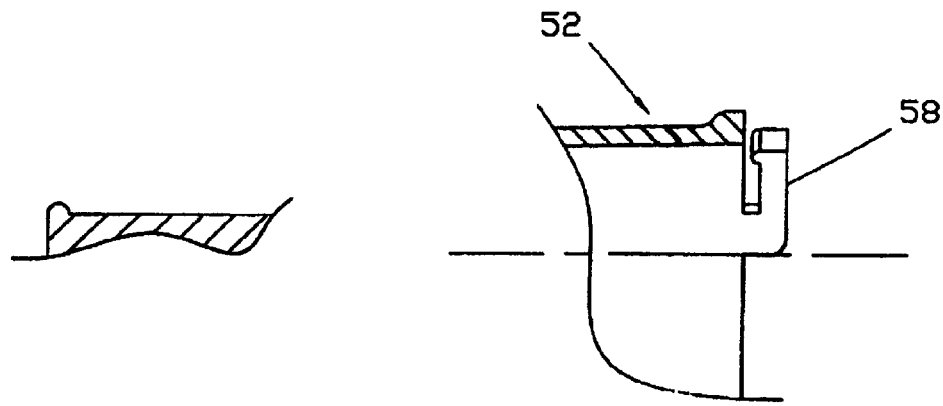
SECTION 19-19
Fig. 19
DETAIL 20
Fig. 20

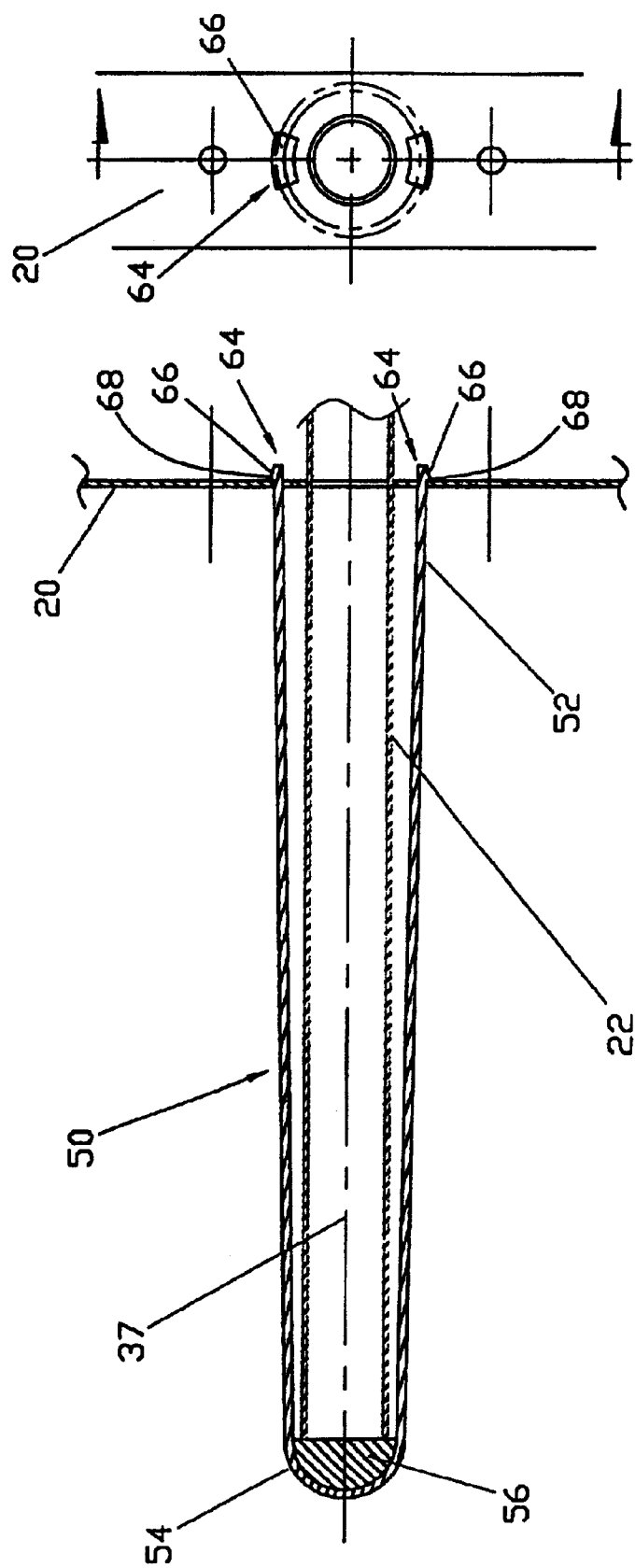

DETAIL 24

PIPE PROTECTOR AND SUPPORT

RELATED APPLICATIONS

This application is a continuation-in-part of application Ser. No. 09/876,862 filed Jun. 7, 2001 now abandoned, which claims the benefit under 35 U.S.C. §119(e) of Application Serial No. 60/210,714 filed Jun. 9, 2000.

FIELD OF THE INVENTION

This invention relates to a method and apparatus for protecting the end of a pipe.

BACKGROUND ART

When water pipes are installed in buildings the pipes often extend along a wall (upwards, downward, or sideways) and then bend and extend horizontally toward the inside of a room, away from the wall. Various connectors fasten to the ends of these pipes in order to hook up sinks, bathtubs, toilets, and other plumbing fixtures. Similar constructions occur with gas lines, electrical lines and tubes carrying other items.

In order to hold these various tubes at predetermined locations relative to structural supports, plumbing straps are used. These straps are typically elongated strips of metal that have large holes in them to accommodate plumbing pipes, with smaller holes to accommodate nails or screws to fasten the straps to building studs.

The ends of the pipes extend beyond the straps, into the room in which the plumbing fixtures are located, such as sinks, bathtubs etc. The distal ends of these pipes can be damaged, accidentally or intentionally. For example, when placing drywall over the pipes, the end of the pipes may be forced into the drywall in order to mark the pipe location on the drywall so that holes can be cut for the pipes. The damage to the pipes impairs the later use of the pipes. There is thus a need for a protector to be used.

During construction, dirt, debris, and airborne particles can enter the distal, open end of the pipes. These unwanted particles usually enter accidentally, but sometimes children or mischievous persons place the particles in the open ends of the pipes. These unwanted particles or liquids also hinder later use of the pipes. Further, unwanted particles sometimes pass beyond the bend in the pipes and fall down into the pipe where removal is difficult or impossible. If not removed before the plumbing fixtures are connected, the particles may damage or impede the function and performance of any plumbing fixtures connected to the pipes through which the residual particles and damage valve seats in plumbing fixtures. There is thus a need for a suitable protector.

Finally, during construction it is common to pressure test the pipes before the construction is accepted by the customer. This pressure testing can be done by installing the plumbing fixtures on the distal ends of the pipes and flowing pressurized water through the system. But if there is a leak it is sometimes necessary to remove the plumbing fixtures to get access to the pipes, and that is cumbersome, time consuming and expensive. There is thus a need to test such pipes before the plumbing fixtures are attached.

The plumbing straps are typically thin so they can fit between a stud and the adjacent wall covering, such as drywall. That results in a plumbing pipe being supported by a thin metal strip that can abrade the pipe and that can produce an undesirably concentrated area of loading when counteracting any lateral force applied on the pipe. These effects can be exacerbated because the holes for the pipes are typically punched out, which can leave a sharp edge on the hole. Additionally, some pipes are soldered or glued to the strap, and the thin strip of metal provides a narrow area of support for the solder or adhesive. Further, it is usually desirable to retain the pipe in a perpendicular relationship to the strap while it is being bonded or soldered in place, and the installer may rely on the strap to retain the pipe. A thin strap, with a simple round opening having suitable clearances for tolerances and adhesive or solder, may not adequately and steadily support the pipe in this perpendicular relationship, thereby resulting in inconvenience to the installer or resulting in compromised results. Similar problems occur if the tubes are something other than plumbing pipes.

There is thus a need for an improved support for tubes that provides an increased area for supporting a tube held by the support, and for providing an increased area for bonding to the tube carried by the support. There is a filter need for providing such an improved support at a low cost.

SUMMARY OF INVENTION

An improved plumbing strap is described first, followed by an improved pipe protector that cooperates with the improved strap, or that cooperates with other straps.

Holes are formed in an elongated strap. The holes have an undulating edge around the periphery of the hole which causes the edge to extend on both sides of a plane containing the strap. The undulations are achieved by forming a plurality of bends that extend outward, preferably radially outward, from the periphery of the hole In particular, a support is provided for tubular members where the support has at least one opening sized to receive and support the tubular member. The opening has a periphery forming an edge to support the tubular member. The support has an undulation on the edge of the opening causing the edge to extend on opposing sides of the support. Advantageously the support comprises an elongated, flat strap having a plurality of openings with the defined undulating edges. The support preferably comprises one of a T-shaped support, an L-shaped support, an elongated strap, and a strap long enough to extend between adjacent studs of a house.

Advantageously the support has a plurality of holes sized to receive a fastener to fasten the support to a structural support. Preferably, the undulations are formed by a plurality of flutes having an apex outward of the periphery of the opening and an enlarged base forming a portion of the opening. Ideally, the undulations are formed by predominantly curved segments to reduce stress concentrations in the support, but the undulations could be formed by triangular shaped flutes having an apex outward of the periphery of the opening with an enlarged end forming a portion of the opening. Preferably, the undulations are formed by at least six flutes each having an apex outward of the periphery and a base forming part of the periphery, the bases of the flutes having distal ends that abut each other.

There is also preferably provided a plumbing strap having a strip of material with a flat portion in which is placed at least one fluted opening having a periphery that undulates onto opposing sides of the flat portion, with at least four undulations. The fluted openings are advantageously formed by flutes having a triangular shape when viewed along an axis orthogonal to the strap. More preferably, there are an even number of flutes with adjacent flutes extending on opposing sides of the strap. Additionally, the flutes preferably have a longitudinal axis that is not perpendicular to an edge of the strap.

The present invention includes not only the strap but the strap used in connection with tubing or pipes. Thus, the above embodiments are used with plumbing pipes, electrical conduit, or other elongated tubular members extending through the opening. Advantageously, there is a soldered connection between the pipe and undulating periphery of the strap or support. Further, at least one end, and preferably both ends of the support or strap are fastened to a building support, such as a stud.

The present invention also provides a plumbing strap for supporting a pipe, where the strap has a peripheral edge defining an opening in the strap with the opening configured to support the pipe extending through the opening during use of the strap. The opening has a first diameter, comprising: a circumference of the opening, which circumference is less than a length of the peripheral edge of the support defining the opening. The peripheral edge is preferably formed by an undulating edge, and ideally the undulating edge extends on opposing sides of the strap.

The undulations strengthen the periphery of the opening. There is thus advantageously provided undulating means cooperating with the periphery for increasing the stiffness of the support at the opening and increasing the length of the peripheral edge contacting the tubing.

The present invention also includes the method of supporting a pipe or tubular member using the features of the apparatus of this invention. There is thus provided a method of holding a pipe, comprising several non-sequential steps. The steps are non-sequential because the order can be changed. The steps include fastening at least one end of a support to a building structure, and placing the pipe through an opening in the support, with the opening having an undulating peripheral edge defining the opening. These steps can be further varied by soldering the pipe to the periphery, with the periphery extending on opposing sides of the strap. The further step of fastening an opposing end of the support to a building structure can also be performed, preferably before the soldering step.

The invention also includes the steps of manufacturing the support or strap described herein. The manufacturing sequence punches out one or more openings for the pipe and preferably one or more holes for fastening the support or strap to a building structure. The undulations are formed next by stamping the periphery of the opening or openings. Next, the opening (s) with the undulations is punched out to define a circular opening and to also preferably make the edge of the undulating opening be parallel to the axis of the tubing that will extend through the opening. The punching step is preferably done while supporting the undulations to prevent deformation of the undulations, although the supporting step could be omitted. The holes for fasteners could be formed after the fluted opening(s) is formed.

Turning to the improved protector for the ends of the pipes, a protective cover is provided that fits over the end of a pipe. A first end of the cover is open to fit over the open end of the pipe. An opposing end of the cover is closed. Intermediate the cover and the enclosed end of the pipe a seal is interposed to provide a seal sufficient to permit pressurization of the pipe without removing the cover. Advantageously, the cover provides a radial seal with the pipe. A radial seal can be provided by moving two opposingly inclined surfaces toward each other to create a radial sealing force.

Advantageously, the cover is removably connected to the support or strap to restrain longitudinal movement of the cover along the length of the pipe to which the cover is connected. Advantageously, projections on a first end of the cover cooperate with openings in the strap to releasably hold the cover to the strap. A bayonet type mount or a snap-in type of connection are believed suitable. Preferably, there is a radial or axis seal between the cover and the pipe or tubing sufficient to prevent leakage of fluid from the cover. The cover can be placed over the pipe without being connected to the strap, especially if the seal is provided as the seal can resist removal of the cover from the pipe. But preferably the cover is connected to the strap. The cover can be connected to a plumbing support that has the undulating edge as described herein, or it can be connected to a strap without the undulating edge.

There is thus advantageously provided a fluid tight cover having a first, open end sized to fit over the pipe during use of the device. The cover has projections extending beyond the open end and located to correspond with the location of the slots on opposing sides of the holes. The projections are sized to engage the slots to fasten the cover to a pipe support. The cover has a closed, distal end that extends beyond the distal end of the pipe during use of the device. A radial seal can be provided on the inside of the cover, with the seal located to sealingly contact the pipe when a pipe extends through one of the holes during use of the device. Alternatively, an axial seal can be placed on the inside of the cover, with the seal sized and located so the seal will be sealingly interposed between the cover and a distal end of a pipe extending through one of the holes during use of the device when the projections engage the slots. Further, the cover can have a removable distal end with the seal located so that the seal is axially compressed between the removable distal end of the cover and the distal end of the pipe during use of the plumbing device. Moreover, the cover can have a removable distal end with the radial seal being further compressed or held in position by the removable cover.

Other objects and features of the invention will be come apparent from consideration of the following description taken in connection with the accompanying drawings, in which like numbers refer to like parts throughout.

DESCRIPTION OF THE DRAWINGS

FIG. 2 shows an enlarged view of a portion of a support of this invention;

FIG. 3 shows a section along line 3-3 of FIG. 2;

FIG. 5 shows an enlarged view of a portion of FIG. 4;

FIG. 6 shows a section along line 6-6 of FIG. 5;

FIG. 15 is a side view of the pipe cover of FIG. 14, with a double bayonet mount;

FIG. 16 is an end view of the pipe cover of FIG. 15;

FIG. 17 is a section taken along section 17-17 of FIG. 15;

FIG. 18 is a section taken along section 18-18 of FIG. 16;

FIG. 19 is a section taken along Section 19-19 of FIG. 17;

FIG. 20 is a partial sectional view of the bayonet mount of the tube cover of FIG. 15;

FIG. 21 is a cross-sectional view of an alternative embodiment of a pipe cover of FIG. 14 with a snap-in connection;

FIG. 22 is an end view of the pipe cover of FIG. 21;

DETAILED DESCRIPTION

Plumbing Strap

Figure 1:
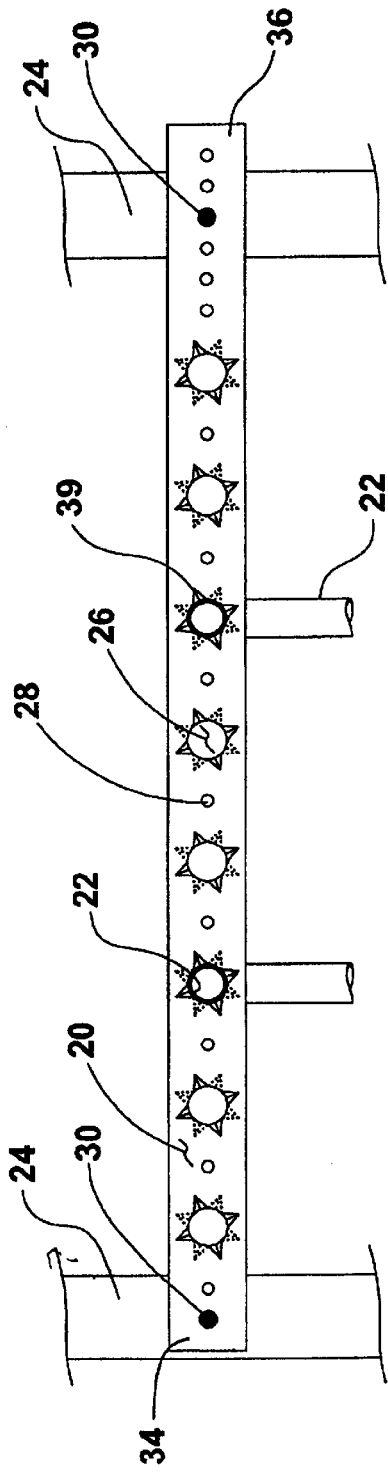
FIG. 1 shows a support of this invention.

Referring to FIGS. 1–3, a support 20 is provided for tubing 22. The tubing can comprise water pipes, plumbing pipes, gas pipes, electrical conduit, or tubing for other items. The following description will refer to the tubing 22 in the context of water pipes as typically used in homes and buildings. The tubing typically runs vertically inside a wall of a building, between adjacent studs 24 of the building. These studs 24 are typically 16 or 24 inches apart in most houses. At the location where the water pipes 22 are to come out of the wall, the pipes bend at 90° and extend perpendicular to the wall. To hold the pipes 22 as they extend from the wall, the support 20 is provided.

The support 20 is sometimes referred to as a plumbing strap, especially when used to hold plumbing pipes. The support 20 preferably comprises an elongated strip of material, typically metal, that has a plurality of openings 26 provided at predetermined locations along a longitudinal axis 27 of the strap. The support 20 is preferably as thin and as flat as possible so that it can be interposed between a sheet of drywall and the studs 24 and not cause a perceptible deformation of the drywall when viewed from the inside of the room. But if no drywall is used, other shapes can be used including straps 20 that are not flat strips of metal, but have stiffeners or other devices on them. On the other hand, even if drywall is used, installation techniques can allow for a degree of relief in the strap, so that it is not necessary for the strap to be completely flat to be used with drywall. For ease of description, however, the support 20 will be referred to as a flat strap with holes through the thin dimension of the strap. But the scope of the invention is not so narrow, and is to be construed as broadly as the prior art and claims permit.

The openings 26 are sized to allow the pipes 22 to pass through the openings, but close enough to the outer diameter so the strap can be soldered to the pipe. The shape of the openings 26 preferably correspond to the shape of the outer periphery of the tubing 22, and the edges of the opening 26 preferably are close enough to the outer periphery of the tubing 22 so the edges of the opening 26 can be soldered to the tubing 22 around the periphery of the opening 26. Because the pipes are typically circular in cross-section, the openings 22 are typically circular. But other shapes can be used. A single strap 20 can have various sized openings 26, and they need not be all the same size as shown in the illustrations.

Intermediate the openings 26 are optionally, but preferably, placed at least one hole 28 sized to allow passage of a fastener 30 used to fasten the strap to the building structure such as studs 24. The fasteners 30 typically comprise nails, screws or staples, with the holes 28 sized and configured to correspond to the fasteners used. As shown in FIG. 1, a single hole 28 is provided half way between the centers of adjacent openings 26, preferably on the longitudinal axis 27. Other locations and different numbers of holes 30 can be provided.

Additionally, a plurality of holes 28 are also located at opposing ends of the strap or strap 20. As shown in FIG. 1, two holes 28 are on the left end 34 and six holes 28 are on the right end 36. The holes allow the strap 20 to be used with a variety of stud spacings while still providing intermediate holes for nails, screws etc. through the strap.

The strap 20 has an edge 38 around the periphery of each opening 26. The edge 38 is not in the plane of the flat strap containing the opening 26 in the strap 20. In particular, and as best seen in FIGS. 2–3, the edge 38 of the opening 26 undulates. Preferably the undulation of edge 38 extends on opposing sides of the plane containing the opening 26. As shown in FIG. 2, the undulation is formed by bending a portion of the edge 38 outward from the plane containing the opening 26, along the longitudinal axis 37 of the pipe that will extend through the opening, or orthogonal to the plane containing the opening. The edge 38 is shown in FIG. 3 as having a curved shape, preferably sinusoidal, although deformations with various combinations of curves or of curves and straight lines (FIGS. 5–6) can be used.

Depending on the way the undulating edge 38 is made, the displacement of the edge 38 away from the strap can cause various shaped flutes 39. Each flute 39 has a base 40 which forms a portion of the periphery of the opening 26 which opening is defined by the undulating edge 38. The base 40 extends along axis 37, out of the plane of the strap 20 which contains longitudinal axis 27. The distal ends of the base 40 lie in or pass through the plane of the strap 20 but those distal ends lie on the periphery 38 that forms the opening 26. The center of the base 40 is offset from the plane of the strap 20 containing the opening. Outward of the opening 26 is a smaller end, an apex 42, which is located in or very near to the plane of the strap 20 that contains the longitudinal axis 27. From the apex 42, preferably in the radial direction toward the center of opening 26, the flute 39 increases in dimension both in the plane of the strap 20, and in the direction orthogonal to that strap 20. Thus, each flute 39 has an enlarged opening extending toward the periphery 38, and forming a portion of the periphery, with a longitudinal axis of the flutes extending along a line extending outward (and preferably radially outward) from the periphery.

Figure 9A:
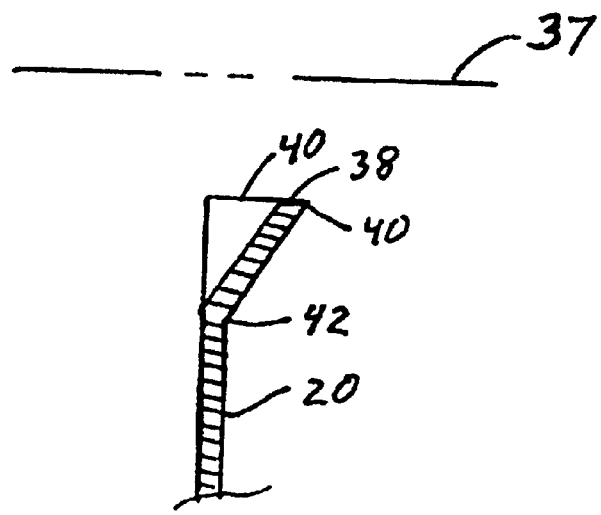
FIGS. 9*a*, 9*b* are partial sectional views taken along 9-9 of FIG. 5.
Figure 9B:
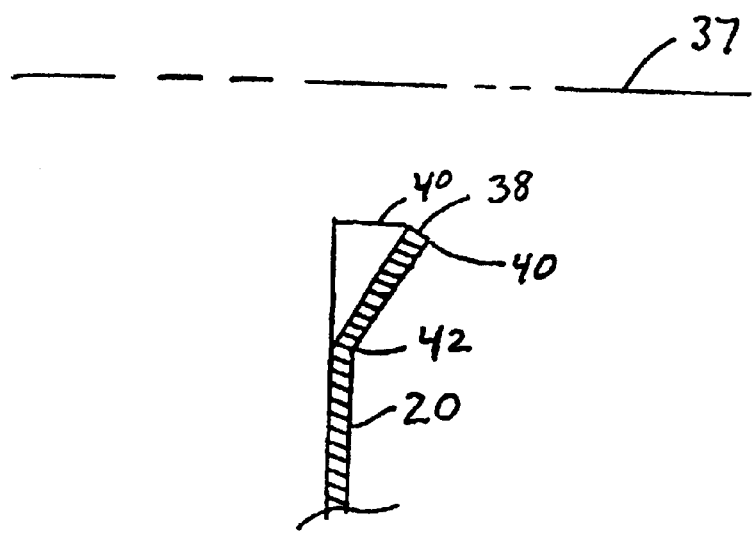

Referring to FIGS. 1–3, the flutes 39 have a generally triangular shape, with the displaced periphery edge 38 including the base 40 of the triangle. The tip of the triangular shaped flute 39 is apex 42, is located in the plane of the strap 20, but outward of the periphery of the opening 26. The flute 39 is shown as having a linearly increasing displacement in a direction parallel to axis 37, when examined at successive points along a line extending from the apex 42 to the center of base 40. Thus, the apex 42 is roughly in the plane of the strap 20 containing longitudinal axis 27, while the center of base 40 is offset from that plane, and the distance between apex 42 and the center of base 40 increases linearly. This is illustrated in FIGS. 9a and 9b.

The offset of the center of base 40 from the plane of the strap 20 is preferably about 1/16 inch (0.0625 inches) for a strap 20 used behind drywall. The offset distance could be greater, but if the strap 20 is placed behind drywall, then the flutes 39 dig into the drywall. When viewed along axis 37, a flute 39 with an offset of about 1/16 inch has a base 40 about ¼ inch long (a chord length) and a length along the longitudinal axis of about ¼ inch.

As shown in FIGS. 2 and 3, the triangular flutes 39 forming the undulating edge 38 can abut each other at the edges of the adjacent bases 40, to provide a continuously undulating periphery of the opening 26. The flutes 39 forming the undulating edge 38 preferably extend on opposing sides of the strap 20 defining the opening 26. Further, the flutes 39 preferably alternate directions around axis 37, so that the adjacent flutes 39 extend on opposing sides of the strap 20. Thus, the flutes 39a are on opposing sides of the strap 20 from the flutes 39b.

As shown in FIG. 2, there are six flutes 39. As few as four flutes 39 are believed possible. To preserve the alternating pattern of flutes 39 as described above, there are advantageously an even number of flutes 39, such as 4, 6, 8, 10, 12, etc, but an odd number could be used if other considerations were deemed more important than the alternating pattern. The openings 26 in FIG. 1 are shown with 8 flutes, while FIGS. 2–3 show six flutes 39. Between 6 and 8 flutes 39 are believed to comprise a good trade-off between increasing the support for the tubing 20, and avoiding a support that is so thin that it damages the tubing 22—as discussed later. Eight flutes 39 are preferred.

Figure 4:
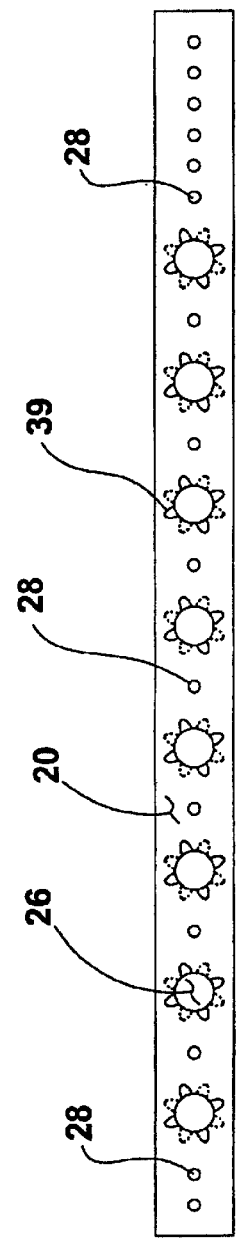
FIG. 4 shows a portion of a further embodiment support of this invention.
Figure 7:
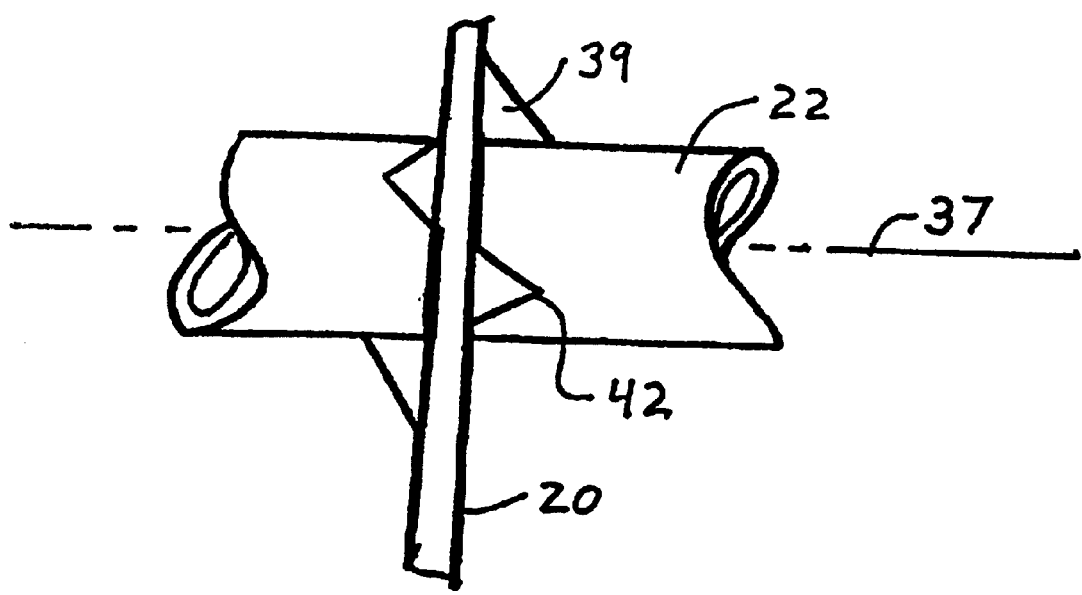
FIG. 7 is a view along line 7-7 of FIG. 5, with a tube through the bracket.

Referring to FIGS. 4–6, embodiments are shown that have flutes 39 that alternate in the direction in which they are offset from the plane containing longitudinal axis 27 of strap 20, but with discontinuities in the transitions between adjacent flutes. The edges of base 40 do not abut the edges of the adjacent base 40 of adjacent flutes 39. This results in portions 44 of the undeformed periphery of the opening 26 being placed intermediate the adjacent bases 40 of the adjacent flutes 39. Thus, the undulating edge 38 is formed by undulating bases 40 of alternate flutes 39, and intermediate portions 44 interposed between adjacent bases 40. In the embodiment of FIGS. 1–3, the undulating edge 38 is formed by undulating bases 40, which abut one another.

Further, in the embodiment of FIGS. 4–6, the undulation is not as curved, but is more angular and straight sided. Making the undulations of edge 38 more curved minimizes stress concentrations. The flutes 39 preferably extend on both sides of the plane of the strap containing the longitudinal axis 27. The openings 26 in FIG. 4 are each shown with eight undulating flutes 39, while FIGS. 5–6 show six flutes. Other numbers of flutes are possible.

Referring to FIG. 1, in use, a strap 20 containing one or more openings 26 is fastened to one or more studs 24 by fasteners 30 such as nails extending through holes 28 that align with the stud(s). The tubes 22 are then placed in appropriate openings 26. Alternatively, the openings 26 can be placed over the pipes or tubing 22, and then the fasteners 30 inserted through the appropriate holes 28 to fasten the strap 20 to the stud or studs 24. The undulating edge 38 provides an increased support for the tubing 22. The tubes 22 can be bonded to the strap by solder or adhesives, or just rested against the undulating edge 38 of the strap 20.

Referring to FIGS. 9a, 9b, preferably, the deformation forming the undulating edge 38 maintains the edge 38 parallel to the axis 37 as reflected in FIG. 9a, rather than angling the edge 38 relative to the axis as shown in FIG. 9b. Having the edge 38 parallel to the axis 37 provides for increased surface area contacting the tubing 22 inserted in the opening 26.

Referring to FIGS. 9a, 9b, the distance that the base 40 is offset from the plane of strap 20 in which the opening 26 is located will affect the amount of increase in the support to the tubing 22. But as the periphery of the opening 26 is deformed, it tends to decrease in thickness and it tends to rotate so that a corner of the periphery is oriented toward the center line 37, as shown in FIG. 9b. Further, even if the undulating edge 38 is maintained parallel to the axis 37 and parallel to the abutting side of the tubing 22, the formation of the flutes can cause the peripheral edge 38 to be thinner than the strap 20. Described another way, as the undulating edge 38 is deformed to form base 40 it can become narrower or thinner than the undeformed portions of strap 20. Thus, intermediate portions 44 can be thicker than the center of base 40.

Either the angling of the edge 38 or a reduction in the thickness of the edge 38 can tend to cut or abrade the abutting portion of tubing 20. Thus, there is a trade-off between the amount of the disruption of the base 40 from the plane of the strap 20 containing the opening 26, and the potential for abrasion or damage to the tubing 22 abutting the deformed base 40. Further, a reduction in the thickness of the edge 38 provides less bonding area for adhesive or solder to retain the tubing 22 in the opening 26. The $\frac{1}{16}$ inch offset to each side of strap 20 is believed to provide an acceptable compromise for use with drywall and plumbing straps to retain water pipes.

Figures 10, 11:
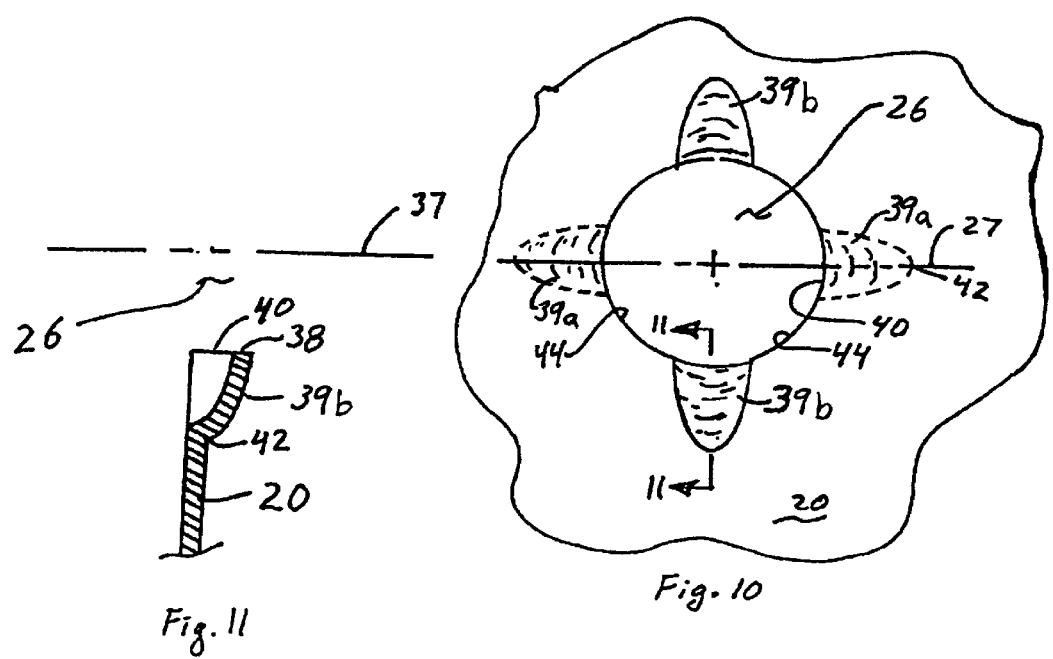
FIG. 10 is a partial sectional view of a further embodiment of an opening for a support of this invention.
FIG. 11. is a partial sectional view taken along 11-11 of FIG. 10.

Referring to FIGS. 10–11, the flutes 39 need not be triangular, but may be of other shapes such as oval, elliptical or circular, and the cross-sectional shape need not be triangular as in FIGS. 5–6, but could be curved as in FIGS. 2–3. FIGS. 10–11 show a strap 20 with four flutes 39, each having an elliptical outer shape, and a curved, preferably elliptical cross-sectional shape. As in the other illustrated embodiments, the flutes 39 each have a base 40 on the peripheral edge 38, and an apex or smaller end 42 outward of the opening 26. The length of the base 40 of the ellipse that forms the peripheral edge 38 is shown as smaller than the length of the intermediate portions 44. Advantageously, the length of the base 40 is greater than the length of the intermediate portions 44, preferably much greater. Ideally, the ends of bases 40 of adjacent flutes 39 abut so the intermediate portions 44 are small relative to the length of a base 40.

Referring to FIGS. 1 and 10–11, the flutes 39 in FIGS. 10–11 are shown with their bases 40 located either adjacent and parallel to the long edge of the strap 20, or along what would normally be the vertical axis if the fluted opening 26 is on a horizontal plumbing strap that has its opposing ends fastened to two adjacent studs 24 as shown in FIG. 1. Phrased another way, the pattern of flutes 39 in FIGS. 10–11 has a longitudinal axis that runs along section lines 11-11 in FIG. 10, and that longitudinal axis is not perpendicular to an adjacent edge of the strap 20. That orientation of the flutes 39 directs the longitudinal axis of a pair of flutes toward the side of the strap 20. This orientation requires a wider strap, which uses more material is heavier and costs more money. There are thus advantages to orientating the flutes 39 so they are symmetrically located about the vertical axis but not on the vertical axis. Thus, for example, the flutes 39 in FIG. 1 have the apexes 42 of the flutes oriented offset from the vertical axis, but symmetric with respect to the vertical axis. The same is true of flutes 39 in FIGS. 2–6.

To make the strap 20 with the fluted openings 26, a strip of material, preferably metal, is punched to form openings 26, except to a diameter somewhat smaller than the ultimately intended dimension, to minimize the area of material which must later be displaced during the formation of the flutes. At the same time, the fastener holes 28 are formed. Then the strap 20 is stamped to form flutes 39 of the desired size and shape around the periphery of the openings 26, which remain smaller than their final diameter. Finally, while capturing and holding the flutes 39 securely, the openings 26 are then punched to their final diameter, to ensure they conform to the shape of the outer periphery of the tubing 22, which is typically circular.

In more detail, the undulating edge 38 can be formed by placing two mating dies on opposing sides of a flat strap 20, and deforming the strap. A two stage die is probably most useful for the stamping. Each of the dies will have the desired shape of the resulting flute 39 in the die. Thus, one die will have the shape of the flutes 39 conforming to one side of the strap 20, while the other dies will have the shape of the flutes 39 on the opposing side of the strap. When the two die abut, they are separated by the shape and thickness of the resulting strap 20 containing the formed flutes 39. Because the flutes 39 advantageously extend on opposing sides of strap 20, the strap will need to be removed from both dies. One die may be lifted off, and the strap 20 can then be lifted off the remaining die, or the remaining die can be moved away from the strap 20 which is held during the removal, or ejector pins can be used to remove the formed strap from the remaining die.

Of course, the elasticity of the material from which the strap 20 is formed must be taken in to consideration if the strap 20 is stamped from metal. If the strap 20 is molded from a polymer based material, such as one or more forms of high durometer plastic, then the contraction of the heated polymer must be considered. If made of material that is caused to flow during the deformation to form the flutes 39, then advantageously, the portion of the flute 39 adjacent the apex 42 is formed first so that material from the outer portion, such as apex 42, is forced toward the opening 26 and base 40. This helps avoid thinning of the peripheral edge 38 and tilting of the edge 38 as in FIG. 9b.

The normal deformation during stamping tends to rotate the corner of the edge 38 toward the axis 37 of the pipe 22, as shown in FIG. 9b, and it also results in an opening 26 that is not perfectly circular. One way to resolve this while still using a simple stamping step and die setup, is to perform a further manufacturing step after stamping the flutes 39. Advantageously, a punching or boring step is used to cut the sharp corner of periphery 38 into either a more rounded corner or preferably into a flat portion akin to the edge 38 shown in FIG. 9a. This punching or boring step will slightly enlarge the opening, meaning that the preliminary size to which opening 26 is punched, before the flutes are formed, must be selected appropriately. This additional punching or boring operation will ensure the opening 26 is circular when viewed along axis 37 which is perpendicular to the strap 20. The final size of the opening 26 is preferably slightly larger than the outer diameter of the tubing 22. The opening 26 is preferably large enough to allow easy insertion and passage of the tubing 22, but small enough to allow solder to flow by capillary action into a gap between the periphery 38 and tubing 22.

If the base 40 is offset too far along axis 37 from the plane of the strap 20 containing the longitudinal axis 40, then a die forming sharper, straight sided flutes 39 is more likely to cause the material forming the flute 39 to separate or crack. The undulating peripheral edge 38 preferably provides a continuous edge, rather than being interrupted by a notch or slot or crack or tear in the material forming the strap 20. A curved base 40 is less likely to separate during formation because it has less stress concentration, and is thus preferred. The greater the radius of curvature, the more deformation is believed possible. Deformations of about 1/16 (0.0625 inches) at the center of base 40 are believed achievable in 18 gage (0.047 inch) metal straps without splitting or cracking the metal strap 20, even when using the triangular flutes 39.

Cold deformation is preferred. But in order to increase the offset of the undulations along axis 37, in the direction orthogonal to the plane of the strap 20 that contains the opening 26, then hot deformation may be preferred to form the flutes 39.

The deformation forming the undulating edge 3 8 and flutes 39 causes localized work-hardening of the strap 20. Generally, the less disruption of the material, the less the work hardening, so the apex 42 has less work hardening than the base 40. The work hardening thus increases the strength of the strap 20. Further, the shape of the flutes also act as localized stiffeners around the fluted opening 26. That results in a stiffer strap 20 and more stable support for the pipes 22.

There is thus advantageously provided a strap with increased support for the pipes or tubing 22, as well as a strengthened strap and a stiffened strap. By orientating the fluted openings 26 so the flutes 39 allow a minimal width of the strap 20, a strap of minimum width can be achieved. The narrow width of the strap allows a reduction in material usage and material cost, thus reducing the cost of the part. The flutes 39 provide increased stiffness resulting in a strong, light weight, but strong, strap 20.

The undulating edge 38 formed by flutes 39 results in an increase in the length of the periphery 38 that encircles and forms opening 26. Normally, the periphery around the opening 26 is defined by the circumference of the opening 26, the circumference having a length of about 3.14 times the diameter of the opening. By deforming the periphery away from the portion of the strap 20 defining the opening 26, the shape of the circular opening 26 can be effectively maintained while the peripheral distance is increased. The increased peripheral distance provides for increased support of pipes 22 extending through the strap 20, and provides increased bonding or soldering area to fasten the strap 20 to the pipe or tubing 22.

While the undulating, fluted periphery 38 extends on both sides of the strap 20, it is believed possible to have the flutes 39 on the same side of the strap 20, but that configuration is not believed to work as well because it does not provide as much increase in support as is possible when the undulating edge 38 extends on opposing sides of the strap, nor does it result in the support load being transmitted symmetrically along a plane containing the axis 27. Thus, flutes 39 extending on opposing sides of the strap 20 are preferred.

Nonetheless, if the strap 20 is placed behind drywall or another wall covering, then the offset of the center of the base 40 is limited because the center of the base 40 will dig in to the wall covering. In such a case, it may be advantageous to have one side of the strap 20 with flutes 39 selected to have an offset to accommodate the covering placed over the strap 20, while the opposing side of the strap has flutes 20 with a greater offset to provide increased support for the tubing 22 held by the strap.

The undulating periphery provides a more stable support. The deformation of the peripheral edge 38 orthogonal to the strap 20, and along axis 37, provides an increase in the support to the tubing 22 along the axis of the tubing extending through the opening 26. If the strap 20 comprises a flat strip, then the tubing 22 is supported by the thickness of the strap 20 measured along the axis 37. But the strap 20 is typically so thin that the tubing 22 can rock about the strap even though restrained from moving in the plane of the strap. By deforming the periphery 38 of the opening the strap 20 extends further along axis 37, on both sides of the strap 20. That provides a support along the length of the tubing 22 that resists rocking of the tubing.

Figure 12:
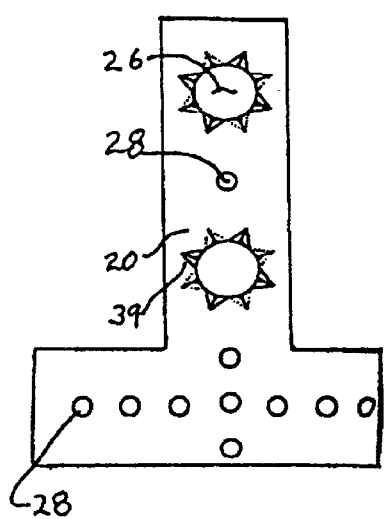
FIG. 12 is a view of a T-shaped support of this invention.
Figure 13:
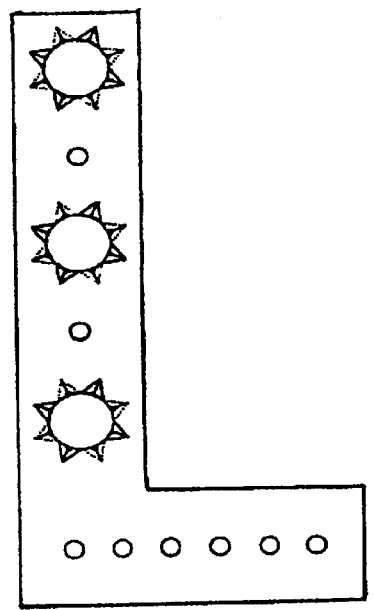
FIG. 13 is a view of an L-shaped support of this invention;.
Figure 8:
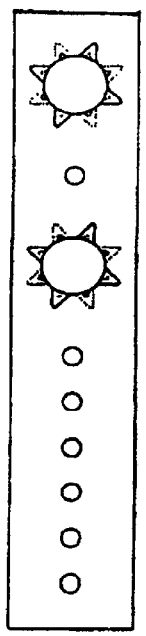
FIG. 8 is a plan view of a cantilevered support of this invention.

The above description is given relative to a plumbing strap 20 that extends between adjacent studs 24. The fluted openings 26 could be used on other supports 20, including T-shaped supports as shown in FIG. 12, L-shaped supports as shown in FIG. 13, and cantilevered supports as shown in FIG. 8. Other variations are possible.

Pipe Cover

Figure 14:
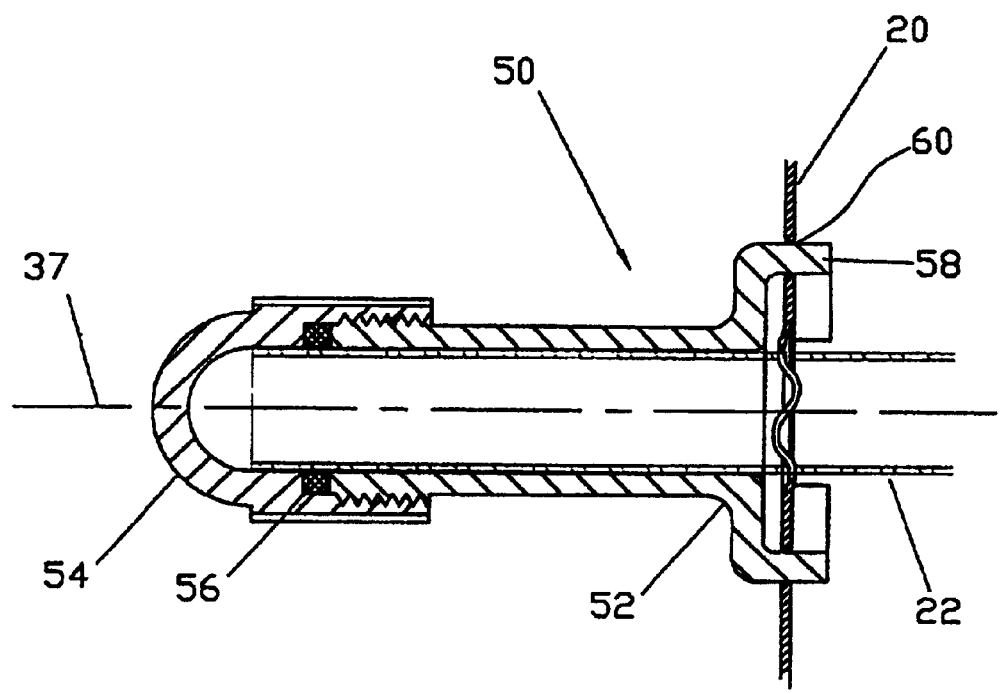
FIG. 14 is a sectional view of a pipe cover installed on the strap of FIG. 1.

Referring to FIG. 14, a tubing, such as water pipe 22, extends from a wall through a pipe support 20, such as plumbing strap. The pipe support advantageously is fastened to a building support and may take the form of the plumbing support shown in FIGS. 1 and 4 which extends between adjacent studs in a building. Alternatively, the pipe support may take the form of the L, T and other shapes shown in FIGS. 8, 12 and 14. For convenience, the pipe support 20 will be described relative to the strap 20 of FIG. 4, but this is for illustration and is not to limit the invention. The strap 20 is advantageously a plumbing strap containing undulations, such as flutes 39, as described above. But straps and the various pipe supports without the undulations could be used.

A protective cover 50 has a first, open end 52 fastened to the strap 20 and an opposing second end 54 covering the distal end of the pipe 22. Advantageously a seal is provided between the cover 50 and the pipe 22 to prevent gas and/or water from pipe 22 from passing out of the cover 50. The second end 54 is shown as comprising a cap threaded onto the end of the cover 50, to compress a resilient seal member 56 against the pipe 22. The seal member 56 advantageously comprises an O-ring seal, and is shown in FIG. 14 as being a radial seal. The seal 56 thus preferably comprises a radial seal located so that the seal is interposed between an exterior circumference of the pipe 22 and an interior circumference of the cover 50 during use of the plumbing device.

Alternatively, the seal 56 could be an axial seal located on the inside of the end cap forming the second end 54 with the seal held against the end of the pipe 22, as indicated in FIGS. 14 and 18, in which case the cover 50 could comprise a single piece, or a multi-part piece. The seal 56 can thus alternatively comprise an axial seal located so that the seal is interposed between the distal end of the pipe and the cover during use of the plumbing device. Further, the cover 50 can advantageously have a removable distal end 54 as shown in FIG. 14, and the seal 56 can be located so that the seal is axially compressed between the removable distal end of the cover and the distal end of the pipe during use of the plumbing device.

The first end 52 of the cover 50 is releasably connected to the strap 20. As shown in FIGS. 15–25, projections on the first end 52 advantageously engage or are held to strap 20. Preferably the first end 52 has bayonet projections 58 which are sized and located to pass through mating openings 60 engage the opposing side of the strap 20. After passing through the openings 60 the projections 58 are rotated in the plane of the strap 20 to a position where they engage the side of the strap 20 opposite the major portion of the cover 50, to lock the cover against axial movement along the axis 37 of pipe 22. Preferably the projections 58 are resiliently urged against the strap 20 during the rotation.

The projections 58 hold the cover 50 from sliding off the pipe 22 during construction of the building in which the pipes 22 are located, and are sufficiently strong for that purpose. Further, the projections 58 need to hold the cover 50 in place when the pipes 22 are pressurized to prevent the cover 50 from blowing off and leaking fluid (gas or liquid).

Some extra strength in the projections 58 is preferably added as a safety factor. The cover 50 can be removably attached to the strap 50 by various ways, but the bayonet connection provides an easily achieved, single-part connection.

Figure 23:
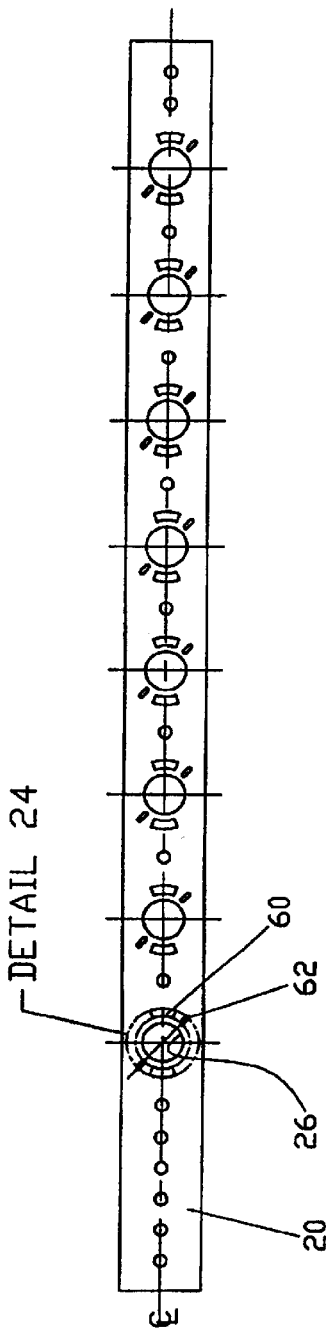
FIG. 23 is a plumbing strap for use with the pipe cover of FIG. 14.
Figure 24:
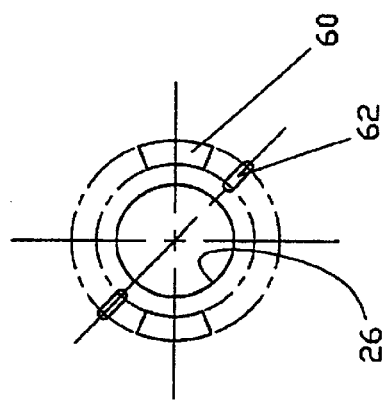
FIG. 24 is an enlarged view of a portion 24-24 of FIG. 23.
Figure 25:
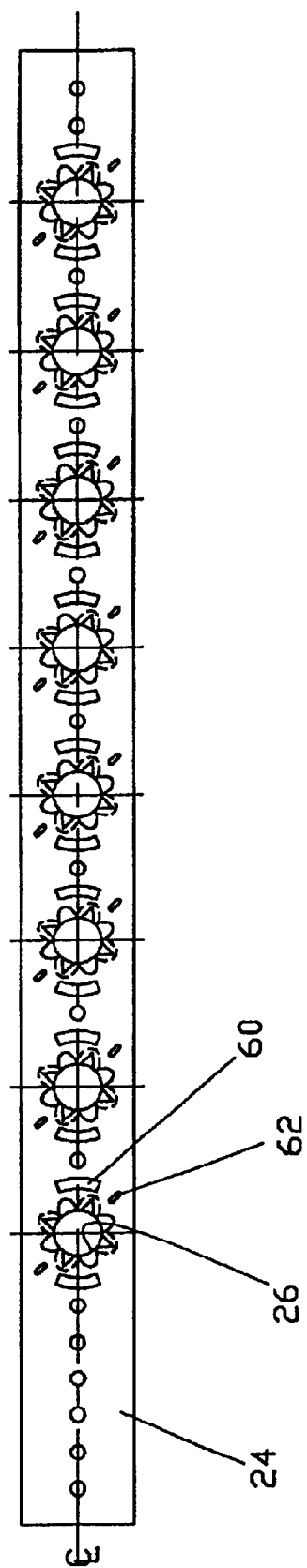
FIG. 25 is another view of the plumbing s trap of FIG. 23.

As shown in FIGS. 23–25, there are preferably secondary openings 62 adjacent the openings 60 through which the bayonet projections 58 are inserted. The openings 60 preferably take the form of slots and are arcuate and concentric with the holes 26 through which the pipe 22 extends (FIG. 4). The further openings 62 are also preferably concentric with each slot 60, the openings 60, 62 being configured so they can accommodate a bayonet mount during use. The distal ends of the projections 58 engage these openings 62 to removably hold the projections in place. Thus, the projections are preferably resiliently urged into the openings 62 to lock them in place. If the strap 20 has the above-described undulations, the openings 60, 62 are preferably radially outside the undulations, or alternatively are spaced intermediate the undulations.

FIG. 21 shows a further embodiment of the cover 50 in which the projections comprise snap-in projections 64. The projections 64 have a tapered portion 66 on an elongated member so the tapered portion can slide through the opening 60 in the strap 20, usually by deforming radially inward or outward. After the tapered portion 66 passes through the strap, the projection is resiliently urged so the lip 68 engages the side of the strap 20 opposing the major portion of body 50. The projections 64 thus advantageously comprise resilient members having a tapered portion 66 on a distal end of the projections to releasably and resiliently engage the additional openings 60 in the support 20 during use.

As shown in FIG. 21, the distal, second end 54 of the cover 50 advantageously has an axial seal 56 in it. The seal 56 could be omitted entirely in which case no fluid-tight seal would be provided. Alternatively, a radial seal of the type shown in FIG. 14 could be used, or other radial seals.

Referring to FIG. 25, a strap 24 having undulating edges of the type described int this application is shown, but with the openings 60, 62 also provided at each opening 26. The openings 60, 62 are preferably provided around each hole 26, but could be provided around any desired number of holes 26.

The cover 50 can be made of various materials and sized sufficient to protect the pipe 22 from being damaged, and preferably to withstand the pressures and forces exerted on cover 50 when the pipes 22 are pressurized with the fluid that will pass through the pipes during their normal use or during testing of the pipes. Plastic materials are preferred, such as ABS, polyethylene, polyurethane, etc.

The pipe support 20 thus provides a support for the pipe, with the support having a first hole 26 (FIG. 1) through which the pipe extends a given distance. The pipe support or strap 20 has additional openings 60, 62, around the hole 26 through which the pipe 22 extends. The cover 50 is preferably fluid tight. It has a first, open end sized to fit over the pipe during use. The cover 50 has projections 58, 64 extending beyond the open end and located to correspond with the location of at least some of the openings 60, 62 in the strap 20. The projections 58, 64 are configured to engage the at least some openings 60, 62 to fasten the cover 50 to the support 20 during use of the cover. The cover 50 also has a closed, distal end that extends beyond the distal end of the pipe during use when the cover is installed. The fluid seal 56 is interposed between the cover 50 and the pipe 22 during use of the device so as to prevent the passage of fluid from the pipe past the seal.

There is also provided a method of temporarily protecting a pipe 22 having a distal end with an opening through which fluid flows during use of the pipe, where the pipe extends through a hole 26 in the plumbing support which is fastened to a building support. The method comprises placing a fluid tight cover 50 over the distal end of the pipe 22. The cover 50 has a first, open end sized to fit over the pipe during use of the device. The cover 50 has resilient projections 58, 64 at the open end. The cover 50 also has a closed, distal end that extends beyond the distal end of the pipe 22 during use of the device. A seal 56 is located on the inside of the cover and interposed between the cover and the pipe. The seal 56 is engaged with the pipe to prevent the passage of fluid from the pipe past the seal. The projections on the cover engage mating openings in the plumbing support 20 to restrain movement of the plumbing device along the length of the cover.

The method advantageously, but optionally, further includes providing the cover 50 with a removable distal end 54. In this embodiment the seal 56 can be located between the removable cover and the distal end of the pipe 22 so the seal 56 is axially compressed against the removable distal end 54 of the cover 50 and the distal end of the pipe during use of the device.

The projections can be provided in the form of a bayonet mount 58 and the openings in the pipe support 20 can be configured and located to accept insertion, rotation and locking of the bayonet mount projections 58. Alternatively, the projections can comprise resilient members 64 having an inclined and notched distal end. In this embodiment, the method includes inserting the notched end through openings in the pipe support 20 to resiliently and releasably engage the surface of the pipe support opposite the cover 50.

The above description is given by way of example, and not limitation. Given the above disclosure, one skilled in the art could devise variations that are within the scope and spirit of the invention. Further, the various features of this invention can be used alone, or in varying combinations with each other and are not intended to be limited to the specific combination described herein. Thus, the invention is not to be limited by the illustrated embodiments but is to be defined by the following claims when read in the broadest reasonable manner to preserve the validity of the claims.

We claim:

1. A plumbing device for use with a pipe having a distal end with an opening through which fluid flows during use of the pipe, the device comprising:
   a support having a first hole through which the pipe extends a given distance, the support cooperating with the pipe to support the pipe during use of the device, the support having additional openings around the hole through which the pipe extends;
   a fluid tight cover having a first, open end sized to fit over the pipe during use of the device, the cover having projections extending beyond the open end and being located to correspond with the location of at least some of the openings in the support, the projections being configured to engage the at least some openings to fasten the cover to the support during use of the device, the cover also having a closed, distal end that extends beyond the distal end of the pipe during use of the device; and
   a fluid seal interposed between the cover and the pipe during use of the device so as to prevent the passage of fluid from the pipe past the seal.

2. The plumbing device of claim 1, wherein the support comprises a strap adapted to be fastened to a support in a building, the strap having at least one aperture adjacent each end of the strap so allow passage of fasteners to fasten the strap to the support during use of the device.

3. The plumbing device of claim 1 wherein the projections form a bayonet mount.

4. The plumbing device of claim 1, wherein the projections comprise resilient members having a tapered portion on a distal end of the projections to releasably and resiliently engage the additional openings in the support during use of the plumbing device.

5. The plumbing device of claim 1, wherein the seal comprises a radial seal located so that the seal is interposed between a exterior circumference of the pipe and an interior of the cover during use of the plumbing device.

6. The plumbing device of claim 1, wherein the seal comprises an axial seal located so that the seal is interposed between the distal end of the pipe and the cover during use of the plumbing device.

7. The plumbing device of claim 1, wherein the cover has a removable distal end and the seal is located so that the seal is axially compressed between the removable distal end of the cover and the distal end of the pipe during use of the plumbing device.

8. The plumbing device of claim 1, wherein the hole in the support has a periphery forming an edge sized to support the pipe during use of the device, with an undulation on the edge of the opening causing the edge to extend on opposing sides of the support.

9. The plumbing device of claim 7, wherein the fluted openings are formed by flutes having a triangular shape when viewed along an axis orthogonal to the support.

10. A device for use with a pipe having a distal end with an opening through which fluid flows during use of the pipe, the device comprising:
    a strip of material having a length sufficient to extend between two building supports and apertures adjacent ends of the strip of material sized to allow the passage of fasteners to fasten the strip of material to the supports, the strip of material having therein a plurality of circular holes each of which has at least two slots concentric with the hole, wherein the slots are arcuate and further comprising a secondary opening adjacent to and concentric with each slot, the slots and secondary openings being configured so they can accommodate a bayonet mount during use of the device.

11. A device for use with a pipe having a distal end with an opening through which fluid flows during use of the pipe, the device comprising:
    a strip of material having a length sufficient to extend between two building supports and apertures adjacent ends of the strip of material sized to allow the passage of fasteners to fasten the strip of material to the supports, the strip of material having therein a plurality of circular holes each of which has at least two slots concentric with the holewherein the slots are arcuate and further comprising a secondary opening adjacent to and concentric with each slot, the slots and secondary openings being configured so they can accommodate a bayonet mount during use of the device, wherein the holes have a periphery that undulates onto opposing sides of the strip of material, with at least four undulations.

12. A device for use with a pipe having a distal end with an opening through which fluid flows during use of the pipe, the device comprising:
    a strip of material having a length sufficient to extend between two building supports and apertures adjacent ends of the strip of material sized to allow the passage of fasteners to fasten the strip of material to the supports, the strip of material having therein a plurality of circular holes each of which has at least two slots concentric with the holewherein the slots are arcuate and further comprising a secondary opening adjacent to and concentric with each slot, the slots and secondary openings being configured so they can accommodate a bayonet mount during use of the device;

a fluid tight cover having a first, open end sized to fit over the pipe during use of the device, the cover having projections extending beyond the open end and located to correspond with the location of the slots on opposing sides of the holes, the projections being sized to engage the slots to fasten the cover to the strip of material, the cover having a closed, distal end that extends beyond the distal end of the pipe during use of the device; and a radial seal on the inside of the cover located to sealingly contact the pipe when a pipe extends through one of the holes during use of the device.

13. A device for use with a pipe having a distal end with an opening through which fluid flows during use of the pipe, the device comprising:

a strip of material having a length sufficient to extend between two building supports and apertures adjacent ends of the strip of material sized to allow the passage of fasteners to fasten the strip of material to the supports, the strip of material having therein a plurality of circular holes each of which has at least two slots concentric with the holewherein the slots are arcuate and further comprising a secondary opening adjacent to and concentric with each slot, the slots and secondary openings being configured so they can accommodate a bayonet mount during use of the device, a fluid tight cover having a first, open end sized to fit over the pipe during use of the device, the open end having projections extending away from and along a length of cover and located to correspond with the location of the slots on opposing sides of the holes, the projections being sized to engage the slots to fasten the cover to the strip of material, the cover having a closed, distal end that extends beyond the distal end of the pipe during use of the device; and an axial seal on the inside of the cover, sized and located so the seal will be sealingly interposed between the cover and a distal end of a pipe extending through one of the holes during use of the device when the projections engage the slots.

14. The plumbing device of claim 13, wherein the cover has a removable distal end and the seal is located so that the seal is axially compressed between the removable distal end of the cover and the distal end of the pipe during use of the plumbing device.

15. A device for use with a pipe having a distal end with an opening through which fluid flows during use of the pipe, the device comprising:

a strip of material having a length sufficient to extend between two building supports and apertures adjacent ends of the strip of material sized to allow the passage of fasteners to fasten the strip of material to the supports, the strip of material having therein a plurality of circular holes each of which has at least two slots concentric with the holewherein the slots are arcuate and further comprising a secondary opening adjacent to and concentric with each slot, the slots and secondary openings being configured so they can accommodate a bayonet mount during use of the device;

a fluid tight cover having a first, open end sized to fit over the pipe during use of the device, the cover having projections extending beyond the open end and located to correspond with the location of the slots on opposing sides of the holes, the projections being resilient and having an inclined distal end adjacent a notch to releasably engage the slots to removably fasten the cover to the strip of material during use of the device, the cover having a closed, distal end that extends beyond the distal end of the pipe during use of the device; and an seal on the inside of the cover sealingly interposed between the cover and a pipe extending through one of the holes during use of the device when the projections engage the slots.

16. A plumbing device for use with a pipe support adapted to be fastened to a support in a building, the pipe support having a first hole through which a plumbing pipe extends a given distance, the pipe support cooperating with the pipe to support the pipe during use of the device, the pipe support having additional openings around the hole through which the pipe extends, comprising:

a fluid tight cover having a first, open end with projections located to correspond with the location of at least some of the openings in the pipe support, the projections engaging the at least some openings to fasten the cover to the pipe support, the cover having a closed, distal end that extends beyond the distal end of the pipe during use of the device; and a seal sealingly interposed between the interior of the cover and the pipe during use of the device to prevent the passage of fluid from the pipe past the seal.

17. The plumbing device of claim 16, wherein the cover has a removable distal end and the seal is located so that the seal is axially compressed between the removable distal end of the cover and the distal end of the pipe during use of the plumbing device.

18. The plumbing device of claim 16, wherein the cover has resilient projections at the open end and forming a bayonet mount.

19. A method of temporarily protecting a pipe having a distal end with an opening through which fluid flows during use of the pipe, the pipe extending through a hole in a plumbing support which is fastened to a building support, the method comprising:

placing a fluid tight cover over the distal end of the pipe, the cover having a first, open end sized to fit over the pipe during use of the device, the cover having resilient projections at the open end, the cover having a closed, distal end that extends beyond the distal end of the pipe during use of the device;

engaging a seal located on the inside of the cover and interposed between the cover and the pipe to prevent the passage of fluid from the pipe past the seal; and engaging the projections on the cover with mating openings in the plumbing support to restrain movement of the plumbing device along the length of the cover.

20. The method of claim 19, wherein the cover has a removable distal end, the method further comprising locating the seal between the removable cover and the distal end of the pipe so the seal is axially compressed against the removable distal end of the cover and the distal end of the pipe during use of the device.

21. The method of claim 19, further comprising providing the projections in the form of a bayonet mount and providing openings in the pipe support to accept insertion, rotation and locking of the bayonet mount projections.

22. The method of claim 19, wherein the projections comprise resilient members having a notched distal end, and further comprising inserting the notched end through openings in the pipe support to resiliently and releasably engage the surface of the pipe support opposite the cover.

23. The method of claim 19, further comprising providing a series of undulations around the hole so that a periphery of the hole extends on opposing sides of the pipe support.

* * * * *